US012705095B2

(12) United States Patent
Park et al.

(10) Patent No.: US 12,705,095 B2
(45) Date of Patent: Aug. 11, 2026

(54) COMPUTATIONAL STORAGE DEVICE AND OPERATION METHOD THEREOF

(71) Applicants: SK hynix Inc., Icheon (KR); Sogang University Research and Business Development Foundation, Seoul (KR)

(72) Inventors: Yeohyeon Park, Seoul (KR); Seungjin Lee, Seoul (KR); Changgyu Lee, Seoul (KR); Youngjae Kim, Seoul (KR); Inhyuk Park, Icheon (KR); Soonyeal Yang, Icheon (KR); Woo Suk Chung, Icheon (KR)

(73) Assignees: SK hynix Inc., Icheon (KR); Sogang University Research and Business Development Foundation, Seoul (KR)

( * ) Notice: Subject to any disclaimer, the term of this patent is extended or adjusted under 35 U.S.C. 154(b) by 441 days.

(21) Appl. No.: 18/450,364

(22) Filed: Aug. 15, 2023

(65) Prior Publication Data

US 2024/0303112 A1 Sep. 12, 2024

(30) Foreign Application Priority Data

Mar. 7, 2023 (KR) ........................ 10-2023-0029950

(51) Int. Cl.
*G06F 9/48* (2006.01)

(52) U.S. Cl.
CPC .................................. *G06F 9/4881* (2013.01)

(58) Field of Classification Search
CPC .... G06F 9/4881; G06F 3/0604; G06F 3/0653; G06F 3/0658; G06F 2212/1016
See application file for complete search history.

(56) References Cited

U.S. PATENT DOCUMENTS 10,534,542 B2 1/2020 Trehan et al.
11,422,616 B2 8/2022 Zhu et al.
2014/0115603 A1* 4/2014 Yu ........................ H04L 47/2441 718/105
2016/0246501 A1* 8/2016 Krishnamurthy ..... G06F 3/0689
2022/0035663 A1* 2/2022 Gillono ............... G06F 9/30047
2022/0269426 A1* 8/2022 Horev ...................... G06F 3/067
2023/0004303 A1* 1/2023 Yang ................... G06F 12/0246
2024/0012679 A1* 1/2024 Koren ................... G06F 9/5061
2024/0160603 A1* 5/2024 Park .................... G06F 16/1847

OTHER PUBLICATIONS

"What is Computational Storage?" Scaleflux Inc, 2021, http://www.scaleflux.com/.

(Continued)

*Primary Examiner* — Sisley N Kim

(57) ABSTRACT

A computational storage device includes a storage device and a computation control circuit. The computation control circuit includes multi-core processor and is configured to generate an input/output (I/O) task according to an I/O command, generate a background task according to the I/O command, select an idle core among a plurality of cores in the multi-core processor to perform the background task, and control the storage device. The computation control circuit may include a task control module configured to select the idle core.

11 Claims, 4 Drawing Sheets

(56) References Cited

OTHER PUBLICATIONS

"Line-Rate Compression on Lustre/ZFS-based Parallel Filesystems using NoLoad® Computational Storage Processor," Eideticom, Los Alamos National Laboratory, 2020, pp. 1-8, https://www.eideticom.com/media/attachments/2020/06/03/noload-compression-zfs.pdf.
"Los Alamos National Laboratory and SK hynix to demonstrate first-of-a-kind ordered Key-value Store Computational Storage Device", SK hynix and Los Alamos National Laboratory, Jul. 29, 2022, https://discover.lanl.gov/news/0728-storage-device.
"Samsung Electronics Develops Second-Generation SmartSSD Computational Storage Drive With Upgraded Processing Functionality", Samsung Electronics, Jul. 2022, Korea, https://news.samsung.com/global/.
Jaeyoung Do et al., "Cost-Effective, Energy-Efficient, and Scalable Storage Computing for Large-Scale AI Applications," ACM Transactions on Storage, vol. 16, No. 4, Article 21, Oct. 2020, pp. 1-37.
Ali Heydarigorji et al., "In-storage Processing of I/O Intensive Applications on Computational Storage Drives", Dec. 23, 2021, 7 pages, https://arxiv.org/abs/2112.12415.
Ali Heydarigorji et al., "HyperTune: Dynamic Hyperparameter Tuning for Efficient Distribution of DNN Training over Heterogeneous Systems," ICCAD '20: Proceedings of the 39th International Conference on Computer-Aided Design, Nov. 2-5, 2020, pp. 1-8, Article No. 88, https://dl.acm.org/doi/10.1145/3400302.3415699.
Devesh Tiwari et al., "Active Flash: Towards Energy-Efficient, In-Situ Data Analytics on Extreme-Scale Machines", in Proceedings of the 11th USENIX Conference on File and Storage Technologies, ser. FAST '13, Feb. 2013, pp. 119-132, San Jose, CA.
Corne Lukken et al., "Past, Present and Future of Computational Storage: A Survey", Association for Computing Machinery, Dec. 13, 2021, 32 pages.
Antonio Barbalace et al., "Computational storage: Where are we today?" 11th Annual Conference on Innovative Data Systems Research, Jan. 10-13, 2021, Chaminade, USA.
Antonio Barbalace et al., "blockNDP: Block-Storage Near Data Processing," Middleware '20: Proceedings of the 21st International Middleware Conference Industrial Track, Dec. 21, 2020, pp. 8-15, https://doi.org/10.1145/3429357.3430519.
Corne Lukken et al., "ZCSD: a Computational Storage Device over Zoned Namespaces (ZNS) SSDs," arXiv preprint arXiv:2112.00142, Nov. 29, 2021, pp. 1-8.
Giulia Frascaria, "e2BPF: an Evaluation of In-Kernel Data Processing with eBPF," Master Thesis, Universiteit van Amsterdam, May 21, 2021, i-77.
Mahdi Torabzadehkashi et al., "Catalina: In-Storage Processing Acceleration for Scalable Big Data Analytics," IEEE, 27th Euromicro International Conference on Parallel, Distributed and Network-Based Processing, Feb. 13-15, 2019, pp. 430-437.
Boncheol Gu et al., "Biscuit: A Framework for Near-Data Processing of Big Data Workloads," ACM/IEEE 43rd Annual International Symposium on Computer Architecture, Jun. 18-22, 2016, pp. 153-165.
Sahand Salamat et al., "NASCENT: Near-Storage Acceleration of Database Sort on SmartSSD," in Proceedings of the ACM/SIGDA International Symposium on Field-Programmable Gate Arrays, Feb. 17, 2021, pp. 262-272, https://doi.org/10.1145/3431920.3439298.
Sahand Salamat et al., "NASCENT2: Generic Near-Storage Sort Accelerator for Data Analytics on SmartSSD," ACM Trans. Reconfigurable Technol. Syst., vol. 15, No. 2, Article 16, Jan. 2022, pp. 1-29.
Zhenyuan Ruan et al., "INSIDER:Designing In-Storage Computing System for Emerging High-Performance Drive," Proceedings of the 2019 USENIX Annual Technical Conference, Jul. 10-12, 2019, pp. 379-394, Renton, WA, https://www.usenix.org/conference/atc19/presentation/ruan.
Wei Cao et al., "POLARDB Meets Computational Storage: Efficiently Support Analytical Workloads in Cloud-Native Relational Database," Proceedings of the 18th USENIX Conference on File and Storage Technologies, Feb. 25-27, 2020, pp. 29-41, Santa Clara, CA, https://www.usenix.org/conference/fast20/presentation/cao-wei.
Sudharsan Seshadri et al., "Willow: A User-Programmable SSD," in Proceedings of the 11th USENIX Symposium on Operating Systems Design and Implementation, Oct. 6-8, 2014, pp. 67-80, Broomfield, Co.
"Why Computational Storage Makes Sense for the Edge," NGD Systems, 2022, 9 pages, https://www.ngdsystems.com/.
"LS2088A Intelligent-SSD Card," Argonboards, Aug. 2022, https://www.argonboards.com/ls2088a-intelligent-ssd-card.
"Build Ultra High-Performance Storage Applications with the Storage Performance Development Kit", SPDK, 2021, https://spdk.io/.
Chang-Gyu Lee et al., "iLSM-SSD: An Intelligent LSM-Tree Based Key-Value SSD for Data Analytics," IEEE 27th International Symposium on Modeling, Analysis, and Simulation of Computer and Telecommunication Systems, Oct. 21-25, 2019, pp. 384-395.
"RocksDB", Facebook, 2021, http://rocksdb.org.
Ali Heydarigorji et al., "Leveraging Computational Storage for Power-Efficient Distributed Data Analytics", ACM Transactions on Embedded Computing Systems, Oct. 2022, pp. 82:1-82:36, vol. 21, No. 6, Article 82, https://doi.org/10.1145/3528577.

* cited by examiner

100
I/O Command
110
Command Processing Module (Core #3)
120
Task Scheduler Module (Core #3)
121
Core Selection Module
130
Core Monitoring Module
140
I/O Task Control Module (Core #3)
141
First Storage Control Module (Core #3)
150
Background Task Control Module (Core #6)
151
Second Storage Control Module (Core #6)

COMPUTATIONAL STORAGE DEVICE AND OPERATION METHOD THEREOF

CROSS-REFERENCE TO RELATED APPLICATION

The present application claims priority under 35 U.S.C. § 119(a) to Korean Patent Application No. 10-2023-0029950, filed on Mar. 7, 2023, which is incorporated herein by reference in its entirety.

BACKGROUND

1. Technical Field

Embodiments generally relate to a computational storage device and an operation method thereof, and more particularly, to a computational storage device configured to schedule an input/output task by recognizing a background task and a method of operating the computational storage device.

2. Related Art

A computational storage device is a storage device with computation functions and includes a plurality of processor cores.

A plurality of processor cores must perform background tasks as well as input/output (I/O) tasks requested by users.

Conventional computational storage devices include a scheduler to schedule I/O tasks and background tasks together and allocate them to a plurality of processor cores.

However, a conventional computational storage device does not distinguish an I/O task from a background task, and as a result, a processing speed for an I/O task may be delayed.

For example, if a background task is derived from an I/O task, both tasks are performed on the same processor core, which can cause resource shortage in the corresponding core.

In addition, a conventional computational storage device does not reallocate I/O tasks, and thus does not efficiently use resources because it does not reallocate I/O tasks even when an idle processor core exists.

As described above, in the conventional computational storage device, I/O tasks are not efficiently processed using insufficient processor cores, resulting in deterioration in I/O performance.

SUMMARY

In accordance with an embodiment of the present disclosure, a computational storage device may include a storage device; and a computation control circuit including a multi-core processor and configured to generate an input/output (I/O) task according to an I/O command, generate a background task according to the I/O command, and control the storage device, wherein the computation control circuit includes a task control module configured to select a core to perform the background task from among a plurality of cores in the multi-core processor according to respective states of operation of the plurality of cores.

In accordance with an embodiment of the present disclosure, a method of operating a computational storage device may include monitoring states of operations of a plurality of cores in a multi-core processor; generating an input/output (I/O) task corresponding to an I/O command; generating a background task corresponding to the I/O command; allocating the I/O task to a designated core among the plurality of cores; selecting a core according to idle states among the plurality of cores; allocating the background task to a selected core; controlling a storage device to process the I/O task; and controlling the storage device to process the background task.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate various embodiments, and explain various principles and advantages of those embodiments.

DETAILED DESCRIPTION

The following detailed description references the accompanying figures in describing illustrative embodiments consistent with this disclosure. The embodiments are provided for illustrative purposes and are not exhaustive. Additional embodiments not explicitly illustrated or described are possible. Further, modifications can be made to presented embodiments within the scope of teachings of the present disclosure. The detailed description is not meant to limit this disclosure. Rather, the scope of the present disclosure is defined in accordance with claims and equivalents thereof. Also, throughout the specification, reference to "an embodiment" or the like is not necessarily to only one embodiment, and different references to any such phrase are not necessarily to the same embodiment(s).

Figure 1:
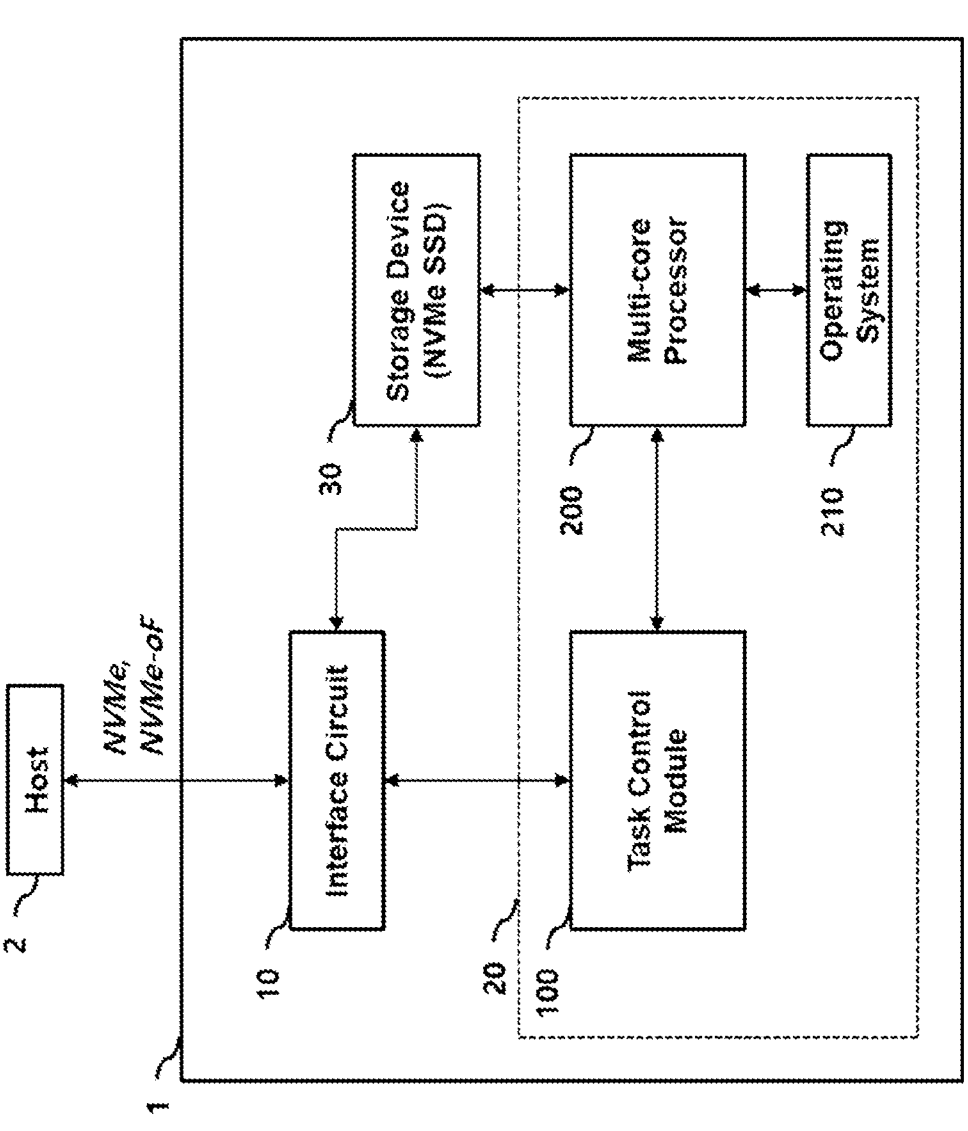
FIG. 1 illustrates a computational storage device according to an embodiment of the present disclosure.

FIG. 1 is a block diagram illustrating a computational storage device 1 according to an embodiment of the present disclosure.

The computational storage device 1 processes I/O tasks according to I/O commands transmitted from the host 2 and performs background tasks derived from the I/O tasks.

In this embodiment, it is assumed that I/O commands transmitted between the host 2 and the computational storage device 1 are based on the Nonvolatile Memory Express (NVMe) protocol or the NVMe over Fabric (NVMe-of) protocol, but embodiments are not limited thereto.

The computational storage device 1 includes an interface circuit 10, a computation control circuit 20 and a storage device 30.

In this embodiment, it is assumed that the storage device 30 is a block-based NVMe Solid State Drive (SSD), but embodiments are not limited thereto.

For example, the storage device 30 may include one or more SSDs, and when including a plurality of SSDs, the plurality of SSDs may operate as one Redundant Array of Independent Disks (RAID) device.

The interface circuit 10 transmits and receives I/O commands and data to and from the host 2.

In this embodiment, it is assumed that the I/O command is a key-value based command, but embodiments are not limited thereto.

The computation control circuit 20 processes an I/O task corresponding to an I/O command for the storage device 30 and a background task derived from the I/O task.

The computation control circuit 20 includes a task control module 100 and a multi-core processor 200.

Overall operation of the multi-core processor 200 is controlled by an operating system 210. Since how the multi-core processor 200 is controlled by the operating system 210 is well known, a detailed description thereof will be omitted.

The task control module 100 controls an operation of processing an I/O task, a background task, or both generated by an I/O command using the multi-core processor 200.

Figure 2:
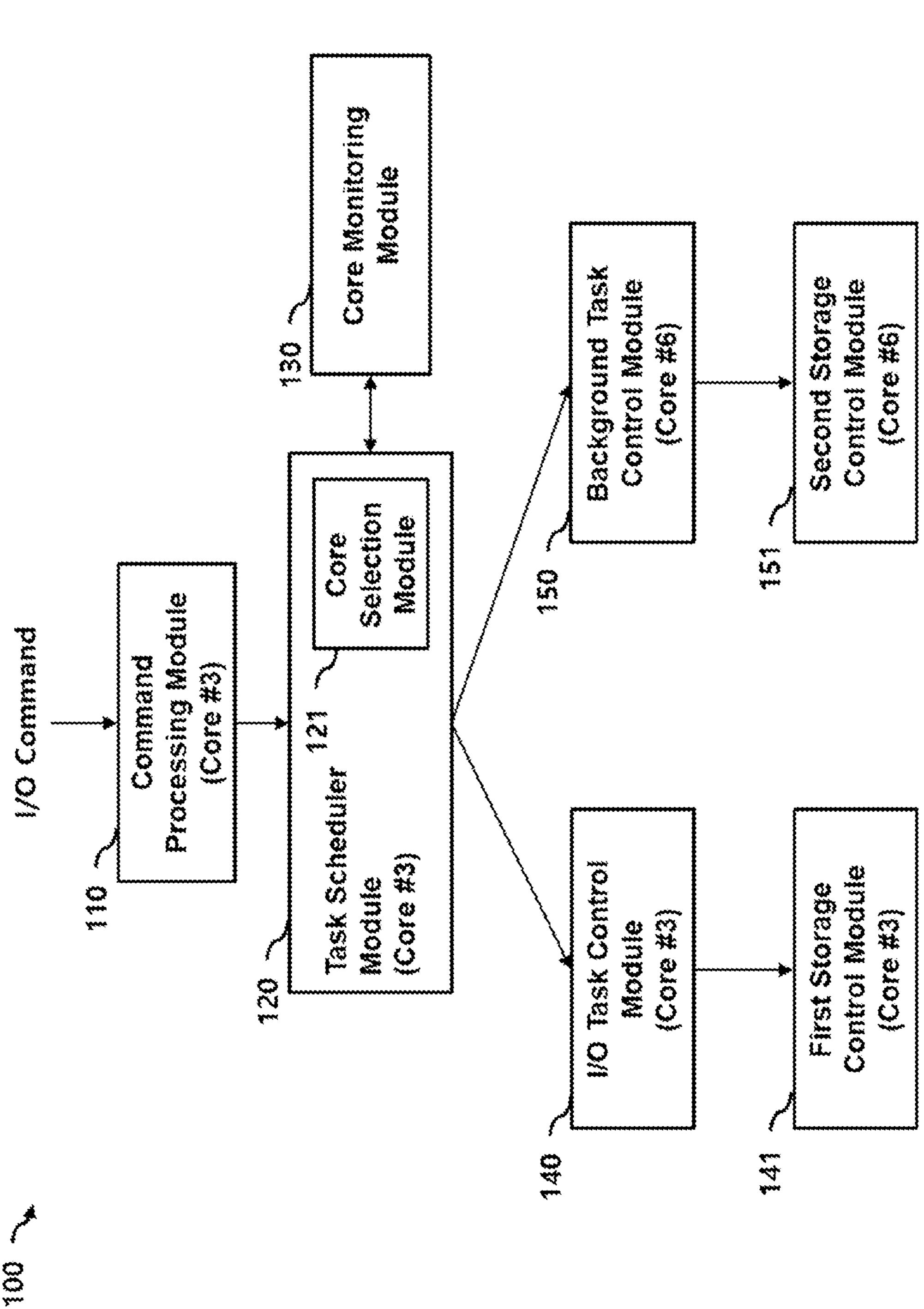
FIG. 2 illustrates a task control module according to an embodiment of the present disclosure.

FIG. 2 is a block diagram showing a task control module 100 according to an embodiment of the present disclosure.

The task control module 100 includes a command processing module 110, a task scheduler module 120, a core monitoring module 130, an I/O task control module 140, a background task control module 150, a first storage control module 141, and a second storage control module 151.

The task control module 100 may be implemented in software, hardware, or a combination thereof.

For example, each module of FIG. 2 may be implemented with a software code such as a function or a library, and may be stored in a storage device such as a volatile or non-volatile memory and loaded into the multi-core processor 200 to be executed.

In another embodiment, each module of FIG. 2 may be implemented in hardware, and each module may perform a corresponding operation by physically exchanging signals with a corresponding core of the multi-core processor 200.

The command processing module 110 converts an I/O command provided from the interface circuit 10 into an I/O request and assigns it to any one designated core among the plurality of cores included in the multi-core processor 200.

At this time, any one designated core may be a core designated by the host 2 through an I/O command or a core designated by the command processing module 110 itself. In the example of FIG. 2, the designated core is core #3.

The I/O request is stored in the event queue corresponding to the designated core, and can be processed by the designated core when the I/O request is reached in the processing order of the event queue.

The task scheduler module 120 is used in the process of processing an I/O request in a designated core.

The task scheduler module 120 generates an I/O task corresponding to an I/O request and a background task corresponding thereto.

Background tasks can include various user-defined tasks, such as data compression and redundant data removal.

The I/O command may designate a type of background task to be performed in response to the I/O request using an opcode, and the task scheduler module 120 may identify the opcode and create a corresponding background task.

The task scheduler module 120 includes a core selection module 121 that selects a core to perform a background task, and the core selection module 121 refers to the core monitoring module 130 to select a core.

In conventional computational storage devices, background tasks derived from I/O tasks are processed in the same core as I/O tasks.

In contrast, in this embodiment, a separate core different from a designated core can be allocated for a background task derived from an I/O task, and for this purpose, a core selection module 121 for selecting a core for a background task with reference to the core monitoring module 130 may be included in the task scheduler module 120.

In this embodiment, the core selection module 121 selects a core for a background task, but is not limited thereto, and in embodiments may additionally perform an operation for selecting a core for an I/O task.

In this example, core #3 is the designated core selected as a core to perform an I/O task as discussed above, and core #6 is selected as a core to perform a background task.

Accordingly, the task scheduler module 120 inserts an I/O task into the event queue for core #3 and inserts a background task into the event queue for core #6.

Figure 3:
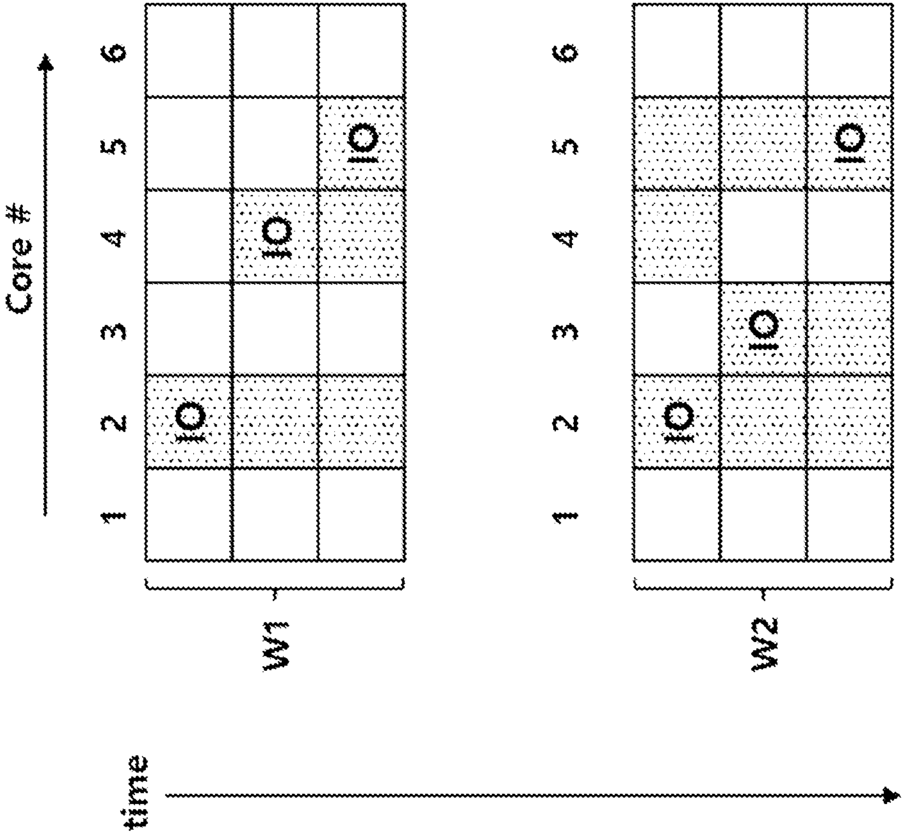
FIG. 3 illustrates an operation of a core monitoring module according to an embodiment of the present disclosure.

FIG. 3 illustrates an operation of the core monitoring module 130 according to an embodiment of the present disclosure.

The core monitoring module 130 monitors states of task processing of a plurality of cores included in the multi-core processor 200 at a regular time interval or time window.

W2 is the current time window, and W1 corresponds to the previous time window immediately preceding W2.

FIG. 3 shows that I/O operations are performed on core #2 from the start of W1 to the end of W1, I/O operations are performed on core #4 from the time when ⅓ of W1 has elapsed to the end of W1, and I/O operations are performed on core #5 from the time when ⅔ of W1 has elapsed to the end of W1.

Accordingly, the core monitoring module 130 classifies cores #1, #3, and #6 as idle cores, and classifies cores #2, #4, and #5 as active cores in the previous time window W1.

FIG. 3 shows that a new I/O operation is performed on core #2 from the start of W2 to the end of W2, a new I/O operation is performed on core #3 from the time when ⅔ of W2 has elapsed to the end of W2, an existing I/O operation is performed on core #4 from the start of W2 to the time when ⅓ of W2 has elapsed, and an existing I/O operation is performed on core #5 from the start of W2 to the time when ⅔ of W2 has elapsed and a new I/O operation is performed on core #5 from the time when ⅔ of W2 has elapsed to the end of W2.

The core monitoring module 130 classifies cores #1 and #6 as idle cores and classifies #2, #3, #4, and #5 as active cores in the current time window W2.

The core monitoring module 130 may additionally monitor utilization of each core in addition to classifying the state of each core into an idle core or an active core.

For example, utilization of a core can be evaluated using the number of I/O tasks processed per unit time by the core. In this case, the unit time may be greater than the interval of the time window, and accordingly, utilization may be calculated for both active and idle cores based on a certain time window.

The core selection module 121 refers to the core monitoring module 130 and selects a core to which a background task is to be assigned.

In this embodiment, in order to select a core to which a background task is assigned at the current time point, a monitoring result in the time window W1 immediately preceding the current time window W2 including the current time point is referred to.

Figure 4:
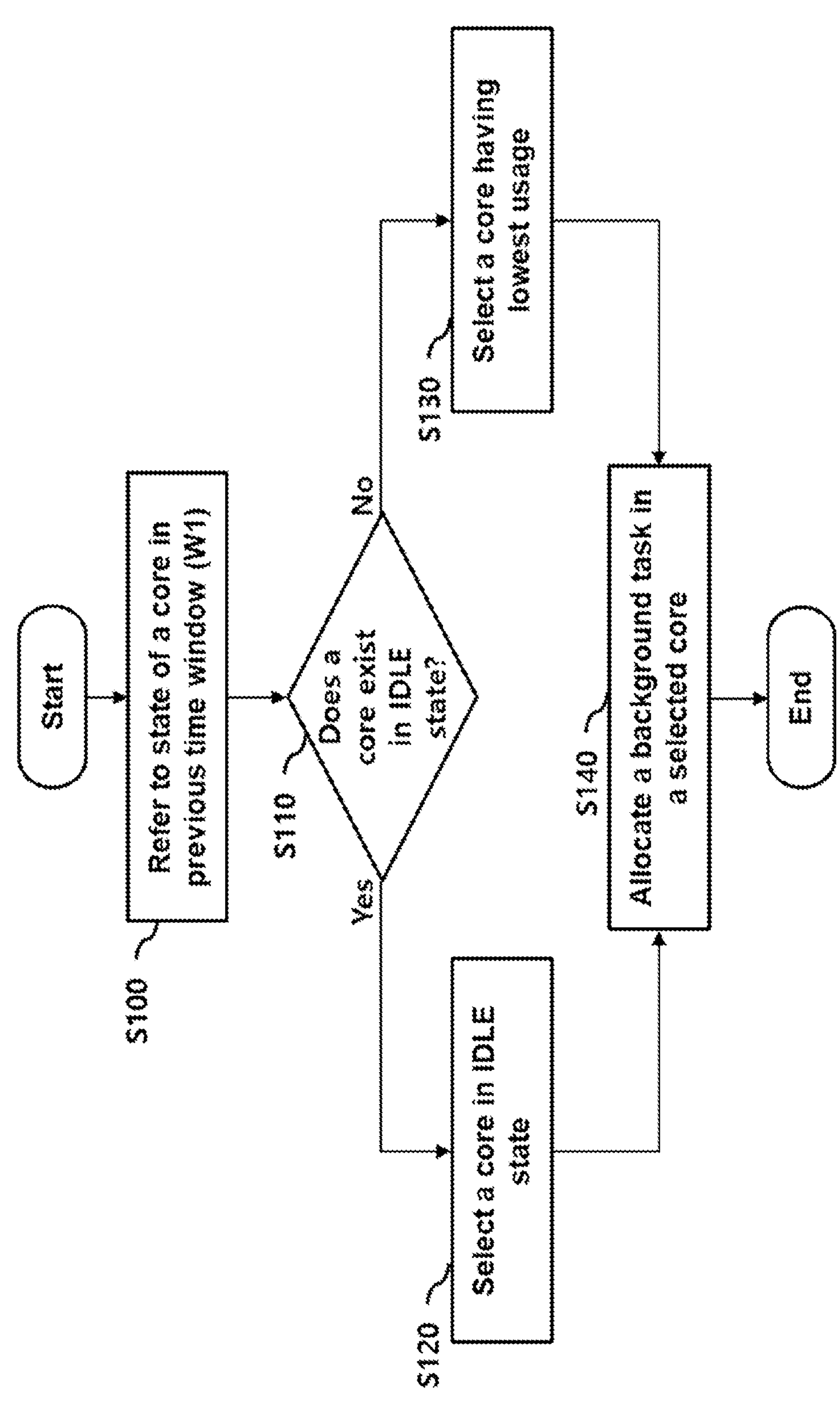
FIG. 4 is a flowchart illustrating an operation to allocate a background task according to an embodiment of the present disclosure.

FIG. 4 is a flowchart illustrating an operation of selecting a core to allocate a background task to according to an embodiment of the present disclosure.

First, the states of cores in the previous time window W1 are referred at S100, and it is determined whether there exists an idle core at S110.

If there exists one or more cores in an idle state, in this embodiment, an arbitrary core is selected from among cores in an idle state at S120. In another embodiment, a core with the lowest utilization may be selected by additionally considering utilization of the cores in the idle state.

If there is no core in an idle state, a core with the lowest utilization among cores in an active state is selected at S130.

Then, a background task is assigned to the selected core at S140. When assigning a background task to the selected core, the background task is inserted into the event queue for the selected core.

Then, the core monitoring module 130 may update the states of the cores in the current time window W2.

Returning to FIG. 2, the I/O task control module 140 controls the I/O tasks scheduled by the task scheduler module 120.

For example, an I/O command includes a key-value based command, and the I/O operation control module 140 performs a basic operation for reading or writing a key-value based storage device 30.

For example, for a key-value based command, the I/O task control module 140 may find a logical block address corresponding to a key by using a hash function and generate a block I/O command using the logical block address.

Since the operation of converting a key-value based command into a block I/O command is known in the arts such in article ″C.-G. Lee, H. Kang, D. Park, S. Park, Y. Kim, J. Noh, W. Chung, and K. Park, "ILSM-SSD: An Intelligent LSM-Tree Based Key-Value SSD for Data Analytics," in Proceedings of the IEEE International Symposium on Modeling, Analysis, and Simulation of Computer and Telecommunication Systems, ser. MASCOTS '19, 2019, pp. 384-395.1, a detailed description thereof will be omitted.

The I/O task control module 140 provides block I/O commands to the first storage control module 141 to control I/O operations of the storage device 30.

When the I/O operation is completed in the storage device 30, the storage device 30 may notify the first storage control module 141 of the completion of the operation. Completion of the task may then be notified sequentially to the I/O task control module 140 and the task scheduler module 120.

The background task control module 150 controls the background task generated by the task scheduler module 120.

As described above, the background task may include various tasks previously determined by a user, such as data compression and a duplicate data removal.

The background task may include computational operations such as data compression and duplicate data removal, and I/O tasks to the storage device 30 may accompany the computational operations.

To this end, the background task control module 150 provides a block I/O command to the second storage control module 151.

In the above, it is assumed that the I/O command provided by the host 2 is a key-value based command and the storage device 30 is a block-based device.

If the storage device 30 is also a device that operates in a key-value method, the first storage control module 141 and the second storage control module 142 convert key-value based commands according to the NVMe protocol and to deliver converted commands to the storage device 30.

In this case, since the I/O task control module 140 merely serves to deliver key-value based I/O commands to the first storage control module 141, the I/O task control module 140 may be omitted. In addition, the background task control module 150 may generate a key-value based command for necessary I/O operations while performing a background task, and transmit the command to the second storage control module 151.

Depending on the format of the I/O command and the operating method of the storage device 30, specific designs of an I/O task control module 140, a background task control module 150, a first storage control module 141, and a second storage control module 151 may be variously modified by a person skilled in the related art.

Although various embodiments have been illustrated and described, various changes and modifications may be made to the described embodiments without departing from the spirit and scope of the invention as defined by the following claims.

What is claimed is:

1. A computational storage device comprising:

a storage device; and a computation control circuit including a multi-core processor and configured to:

generate an input/output (I/O) task according to an I/O command, generate a background task according to the I/O command, and control the storage device, wherein the computation control circuit further includes a task control module comprising:

a core monitoring module configured to monitor respective states of operations of a plurality of cores in the multi-core processor for a current time window; and a task scheduler module configured to generate the I/O task and the background task, wherein the task scheduler module includes a core selection module configured to select a core to perform the background task by referencing the respective states of operations accumulated during a previous time window.

2. The computational storage device of claim 1, wherein the task control module includes:

a first storage control module configured to control the storage device corresponding to the I/O task;

a background task control module configured to process the background task; and a second storage control module configured to control the storage device for an I/O task being generated during processing the background task.

3. The computational storage device of claim 2, wherein the task control module further comprises an I/O task control module configured to control the first storage control module.

4. The computational storage device of claim 3, wherein the I/O command is a key-value based command, and the storage device is a block based device, and the I/O task control module converts a key-value based command into a block based command.

5. The computational storage device of claim 1, wherein a designated core for processing the background task is different from the core selected for processing the I/O task.

6. The computational storage device of claim 5, wherein the designated core is designated by the I/O command.

7. The computational storage device of claim 1, wherein the background task includes data compression or duplicate data removal, and wherein a type of the background task is identified by an opcode included in the I/O command.

8. A method of operating a computational storage device, the method comprising:

monitoring states of operations of a plurality of cores in a multi-core processor during a current time window;

generating an input/output (I/O) task corresponding to an I/O command;

generating a background task corresponding to the I/O command;

allocating the I/O task to a designated core among the plurality of cores;

selecting a core by referencing the respective states of operations accumulated during a previous time window;

allocating the background task to a selected core;

controlling a storage device to process the I/O task; and controlling the storage device to process the background task.

9. The method of claim 8, wherein the selecting a core includes:

selecting a core determined to be in an idle state as the selected core based on the respective states of operations accumulated during the previous time window; and selecting a core having lowest utilization among the plurality of cores as the selected core when none of the plurality of cores are determined to be in the idle state.

10. The method of claim 8, further comprising identifying a type of a background task from the I/O command, wherein the background task includes data compression or duplicate data removal.

11. The method of claim 8, further comprising generating a block based I/O command corresponding to the I/O command for the I/O task when the I/O command is a key-value based I/O command.

* * * * *